US012506253B2

(12) United States Patent
Zhu et al.

(10) Patent No.: US 12,506,253 B2
(45) Date of Patent: Dec. 23, 2025

(54) MILLIMETER WAVE ANTENNA, APPARATUS, AND ELECTRONIC DEVICE

(71) Applicant: Huawei Technologies Co., Ltd., Shenzhen (CN)

(72) Inventors: Naida Zhu, Shanghai (CN); Meng Hou, Shanghai (CN); Youquan Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/547,779

(22) PCT Filed: Feb. 25, 2022

(86) PCT No.: PCT/CN2022/077857

§ 371 (c)(1),
(2) Date: Aug. 24, 2023

(87) PCT Pub. No.: WO2022/179596

PCT Pub. Date: Sep. 1, 2022

(65) Prior Publication Data

US 2024/0304999 A1 Sep. 12, 2024

(30) Foreign Application Priority Data

Feb. 26, 2021 (CN) ......................... 202110222745.2

(51) Int. Cl.
*H01Q 1/24* (2006.01)
*H01Q 5/357* (2015.01)
(Continued)

(52) U.S. Cl.
CPC ............ *H01Q 1/243* (2013.01); *H01Q 5/357* (2015.01); *H01Q 5/385* (2015.01);
(Continued)

(58) Field of Classification Search
CPC ........ H01Q 1/2283; H01Q 1/243; H01Q 1/38; H01Q 5/342; H01Q 5/35; H01Q 5/357;
(Continued)

(56) References Cited

U.S. PATENT DOCUMENTS

2020/0412008 A1 12/2020 Liu et al.
2021/0376483 A1* 12/2021 Chan ................. H01Q 21/0037

FOREIGN PATENT DOCUMENTS

CN 107611581 A 1/2018
CN 108717996 A 10/2018
(Continued)

OTHER PUBLICATIONS

Yang Qingling et al: "Cavity-Backed Slot-Coupled Patch Antenna Array With Dual Slant Polarization for Millimeter-Wave Base Station Applications," IEEE Transactions on Antennas and Propagation, IEEE, USA, vol. 69, No. 3, Aug. 24, 2020, pp. 1404-1413, XP011842548.

*Primary Examiner* — Robert Karacsony
(74) *Attorney, Agent, or Firm* — Conley Rose, P.C.

(57) ABSTRACT

A millimeter wave antenna includes a first metal plate, a second metal plate, and a radiation patch that are arranged in a stack manner. The first metal plate and the second metal plate form a cavity, and a first feeder is disposed in the cavity to feed the cavity. The second metal plate has a first slot. The radiation patch includes at least two patch elements, and a first patch slot is formed between the at least two patch elements. The first slot feeds the radiation patch.

18 Claims, 12 Drawing Sheets

(51) Int. Cl.
*H01Q 5/385* (2015.01)
*H01Q 9/04* (2006.01)
*H01Q 13/18* (2006.01)
*H01Q 19/00* (2006.01)

(52) U.S. Cl.
CPC ........... *H01Q 9/0457* (2013.01); *H01Q 13/18* (2013.01); *H01Q 19/005* (2013.01)

(58) Field of Classification Search
CPC ...... H01Q 5/378; H01Q 5/385; H01Q 9/0407; H01Q 9/0414; H01Q 9/0421; H01Q 9/045; H01Q 9/0457; H01Q 13/18; H01Q 19/005; H01Q 21/065; H01Q 21/08; H01Q 21/24; H01Q 21/26
See application file for complete search history.

(56) References Cited

FOREIGN PATENT DOCUMENTS

| | | | |
|---|---|---|---|
| CN | 110336126 | A | 10/2019 |
| CN | 110380213 | A | 10/2019 |
| CN | 110416746 | A | 11/2019 |
| WO | 2021022941 | A1 | 2/2021 |

* cited by examiner

MILLIMETER WAVE ANTENNA, APPARATUS, AND ELECTRONIC DEVICE

CROSS-REFERENCE TO RELATED APPLICATIONS

This is a U.S. National Stage of International Patent Application No. PCT/CN2022/077857 filed on Feb. 25, 2022, which claims priority to Chinese Patent Application No. 202110222745.2 filed on Feb. 26, 2021. Both of the aforementioned applications are hereby incorporated by reference in their entireties.

TECHNICAL FIELD

This application relates to the field of communication technologies, and in particular, to a millimeter wave antenna, an apparatus, and an electronic device.

BACKGROUND

With development of antenna technologies, antennas in a terminal, for example, a mobile phone, gradually use a millimeter wave frequency band. However, a millimeter wave is prone to absorption and scattering effects of small particles, for example, gas molecules, condensates and suspended dust in an atmosphere, and a path loss is relatively serious. Therefore, a millimeter wave antenna needs to have features, for example, a high gain and beamforming, to overcome the path loss.

In addition, an operating band of a general millimeter wave antenna is narrow, and a use requirement needs to be met through cooperation of a plurality of millimeter wave antennas. The millimeter wave antennas have a large overall volume and low integration.

SUMMARY

An objective of this application is to provide a millimeter wave antenna, an apparatus, and an electronic device, to resolve at least one of problems of a narrow operating band and low integration of an existing millimeter wave antenna.

To resolve the foregoing technical problems, this application provides a millimeter wave antenna, including a first metal plate, a second metal plate, and a radiation patch that are arranged m a stack manner. The first metal plate and the second metal plate form a cavity, and a first feeder is disposed in the cavity to feed the cavity. The second metal plate has a first slot. The radiation patch includes at least two patch elements, and a first patch slot is formed between the at least two patch elements. The first slot feeds the radiation patch.

In some embodiments, the first slot is parallel to the first patch slot, to better implement coupling feed to the radiation patch.

In some embodiments, the first feeder stimulates the cavity and the first slot to generate a first resonance mode. The first slot stimulates the radiation patch, to generate a second resonance mode and a third resonance mode. Resonance frequencies of the first resonance mode, the second resonance mode, and the third resonance mode are different. It should be understood that, based on the first resonance mode, the second resonance mode, and the third resonance mode that are stimulated by the millimeter wave antenna, the millimeter wave antenna may have a large relative bandwidth, to cover a frequency band specified in a 5G technology as much as possible. For example, the millimeter wave antenna may operate in an ultra-wideband, where the ultra-wideband means that a relative bandwidth of the antenna is greater than 50%. In addition, through cooperation between the first metal plate, the second metal plate, and the radiation patch, the millimeter wave antenna may further have a small size, to facilitate installation in an electronic device.

In some embodiments, the first metal plate and the second metal plate are electrically connected through a via. The first metal plate, the second metal plate, and the via enclose the cavity. It should be understood that the cavity may suppress a higher-order mode between the first metal plate and the second metal plate, to improve efficiency of the millimeter wave antenna, and may reduce impact of the higher-order mode on modes of the millimeter wave antenna. In addition, compared with a microstrip, the cavity may further improve anti-interference performance of a signal, to improve a signal transmission effect.

In some embodiments, the first slot is arrow-shaped, rectangular, H-shaped, dumbbell-shaped, or butterfly-shaped. It should be understood that when the first slot is arrow-shaped, the first slot may have a longer current path. To be specific, when a requirement of a specific resonance frequency is met, the second metal plate bearing the first slot may have a smaller size.

In some embodiments, the cavity is a rectangle, and the first slot is disposed along a diagonal of the cavity. Based on this, a diagonal size of the cavity can be fully used, and a longer-length first slot can be obtained in a limited cavity area, so that the second metal plate has a smaller area, to implement miniaturization of the millimeter wave antenna.

In some embodiments, the radiation patch is rectangular, circular, ring-shaped, fan-shaped, or diamond-shaped.

In some embodiments, to further extend a bandwidth and obtain a higher radiation gain, the radiation patch may be connected to the second metal plate through vias, where the vias are separately located on two sides of a width direction of the first slot.

In some embodiments, the antenna further includes a plurality of parasitic patches. The plurality of parasitic patches are arranged around the radiation patch, to broaden an operating band of the millimeter wave antenna and increase an antenna aperture.

In some embodiments, the antenna further includes at least one parasitic patch. The parasitic patch and the radiation patch are arranged in a stack manner. The radiation patch may be cross-shaped, rectangular, or the like. This is not specifically limited in this embodiment of this application. The parasitic patch and the radiation patch are arranged in a stack manner, so that the operating band of the millimeter wave antenna can be broadened and the antenna aperture can be increased.

In some embodiments, the antenna further includes a parasitic metal post, and the parasitic metal post is disposed on the second metal plate and surrounds the radiation patch. The parasitic metal post and the radiation patch generate a fourth resonance mode. Based on this, the millimeter wave antenna may have four modes, to more comprehensively cover a frequency band specified in the 5G technology. For example, the millimeter wave antenna may operate in a frequency band of 23.5 GHz to 44.2 GHz, and the relative bandwidth of the millimeter wave antenna is 61.1%.

In some embodiments, a height of the parasitic metal post is less than or equal to a shortest distance between the second metal plate and the radiation patch. It should be understood that the parasitic metal post does not affect an overall height of the millimeter wave antenna. To be specific, when the fourth resonance mode is added to the millimeter wave antenna, a volume of the millimeter wave antenna is not increased, to implement miniaturization of the antenna.

In some embodiments, the antenna further includes a matching metal post, and the matching metal post is disposed on the second metal plate and surrounds an edge of the second metal plate. The matching metal post may be used for impedance matching. In some embodiments, a radiation gain of the millimeter wave antenna may be increased by adjusting a distance between the matching metal post and the radiation patch.

In some embodiments, an operating frequency of the antenna includes frequency bands of n257 (26.5 GHz to 29.5 GHz), n258 (24.25 GHz to 27.5 GHz), n259 (40.5 GHz to 43.5 GHz), n260 (37 GHz to 40 GHz), and n261 (27.5 GHz to 28.35 GHz).

In some embodiments, the antenna further includes a second feeder (for example, a probe, a microstrip, a strip line, and the like). In some embodiments, when the second feeder and the first feeder are microstrips or strip lines, the second feeder and the first feeder may be intersected (for example, perpendicular). In some embodiments, the second feeder is perpendicular to the first feeder to reduce a cross-polarization level of radiation. The second metal plate further has a second slot, and the second slot intersects with the first slot (for example, the second slot may be perpendicular to the first slot to reduce the cross-polarization level of radiation). There are at least four patch elements, and the radiation patch further has a second patch slot. The second feeder stimulates the cavity to generate the first resonance mode, and the second slot is used to stimulate the radiation patch to generate the second resonance mode and the third resonance mode. The second slot is further used to stimulate the parasitic metal post and the radiation patch, to generate the fourth resonance mode. Based on this, the millimeter wave antenna can implement a dual-polarization function.

In some embodiments, the antenna has a rotational symmetry axis; and/or the antenna has a symmetry surface. It should be understood that, based on a symmetric antenna structure, processing of the millimeter wave antenna can be facilitated, and the volume of the millimeter wave antenna can be reduced.

In some embodiments, the antenna is applied to an array antenna and serves as an antenna element of the array antenna. There may be one, two, or more antenna elements. The array antenna includes at least one antenna element, and the antenna element includes the millimeter wave antenna described in the foregoing embodiment.

In some embodiments, the cavity is shaped like at least one or a combination of a rectangle, a triangle, a circle, or an ellipse. A length direction or a width direction of the cavity is disposed along a diagonal of the second metal plate.

In some embodiments, the volume of the antenna is greater than or equal to $0.24\lambda_0*0.24\lambda_0*0.07\lambda_0$, where $\lambda_0$ is a wavelength of an electromagnetic wave in the air at a lowest operating frequency.

In some embodiments, the first feeder and the second feeder are microstrips; or the first feeder and the second feeder are strip lines. The first slot is perpendicular to the first feeder, and the second slot is perpendicular to the second feeder, so that an effect of coupling feed of the millimeter wave antenna can be improved.

In some embodiments, the second resonance mode is a $TM_{10}$ mode, and the third resonance mode is an inverse-phase $TM_{20}$ mode.

This application further provides an antenna module. The antenna module includes a packaging element and the millimeter wave antenna described in the foregoing embodiments.

This application further provides an apparatus. The apparatus includes a radio frequency module and the antenna described in the foregoing embodiments. The radio frequency module includes at least one of a filter, a switch, a low noise amplifier, and a power amplifier.

The radio frequency module and the antenna are integrated into one apparatus, so that space can be saved in an integration manner, and a loss that occurs in a signal transmission process can be reduced.

This application further provides an electronic device. The electronic device includes an antenna carrier, and the millimeter wave antenna, the array antenna, the antenna module, or the apparatus described in the foregoing embodiments. The millimeter wave antenna, the array antenna, the antenna module, or the apparatus is disposed on the antenna carrier.

In some embodiments, the antenna carrier is a middle frame, a rear cover, a display, or a circuit board of the electronic device.

In this application, through cooperation between structures such as the first metal plate, the second metal plate, the radiation patch, and the first feeder, the millimeter wave antenna can have the first resonance mode, the second resonance mode, and the third resonance mode, to cover the frequency band specified in the 5G technology as much as possible, and meet a wireless communication requirement. In addition, based on the foregoing structure, miniaturization of the millimeter wave antenna may be implemented, to improve integration of an electronic device to which the millimeter wave antenna is applied.

DESCRIPTION OF EMBODIMENTS

Figure 1:
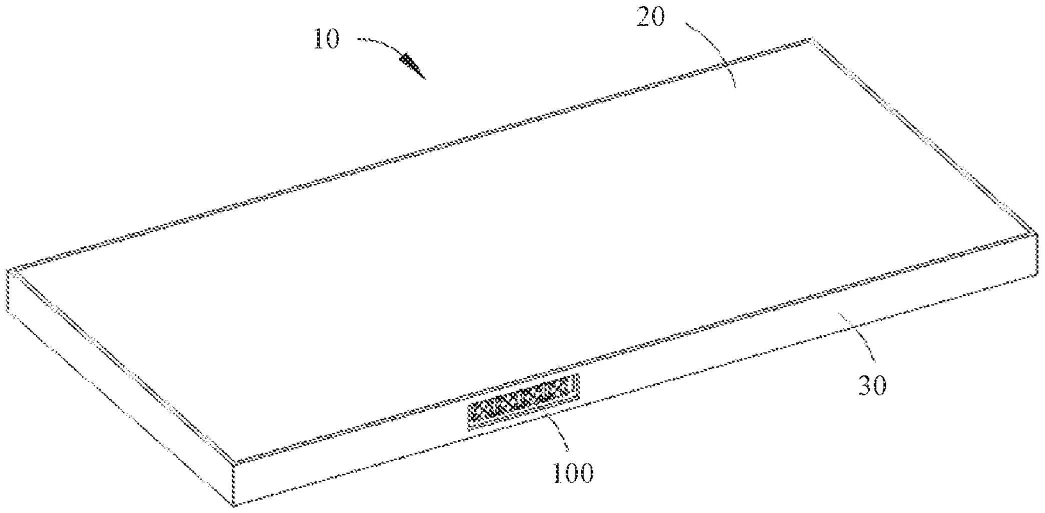
FIG. 1 is a three-dimensional diagram of an electronic device according to an embodiment of this application.

The following clearly describes the technical solutions in embodiments of this application with reference to accompanying drawings in embodiments of this application.

In an electronic device, to meet various use requirements of a user based on a wireless communication technology, a plurality of antennas are generally disposed. For example, a millimeter wave antenna is disposed in the electronic device to meet a 5G (5th Generation, 5th generation) mobile communication requirement of the user, and this may be applied to a scenario, for example, a call or a video call; or an NFC (Near Field Communication, near field communication) chip is disposed in the electronic device to meet a near field communication requirement of the user, and this may be applied to a scenario, for example, mobile payment, bus payment, or identity identification. It should be understood that the millimeter wave antenna is an example name, and does not represent a specific limitation on an operating wavelength corresponding to normal communication of the antenna.

Corresponding to 5G mobile communication, frequency bands of the antenna include at least n257 (26.5 GHz to 29.5 GHz), n258 (24.25 GHz to 27.5 GHz), n259 (40.5 GHz to 43.5 GHz), n260 (37 GHz to 40 GHz), and n261 (27.5 GHz to 28.35 GHz). However, in a general electronic device, an operating band and a relative bandwidth of a millimeter wave antenna are narrow, and the relative bandwidth is a ratio of a signal bandwidth (or a frequency band) to a mid frequency.

For example, a millimeter wave antenna may operate in a frequency band of n257, a corresponding signal bandwidth Δf=29.5 GHz-26.5 GHz=3 GHz, and a mid frequency $f_0$=(29.5 GHz+26.5 GHz)/2=28 GHz. In this case, a relative bandwidth ffoc1=Δf/$f_0$=3 GHz/28 GHz=10.7%.

For another example, a millimeter wave antenna may operate in frequency bands of n257 and n258, a corresponding relative bandwidth ffoc2=(29.5 GHz−24.25 GHz)/((29.5 GHz+24.25 GHz)/2)=19.5%.

As described above, a relative bandwidth of a general millimeter wave antenna is narrow. To be specific, a single millimeter wave antenna cannot operate well in a plurality of frequency bands specified in the 5G technology. When the millimeter wave antenna is applied to the electronic device, through cooperation of a plurality of millimeter wave antennas (or millimeter wave antenna arrays) with different resonance frequencies are generally used, the electronic device can cover the plurality of frequency bands specified in the 5G technology. For example, three millimeter wave antennas (or millimeter wave antenna arrays) are disposed in the electronic device, and the three millimeter wave antennas (or millimeter wave antenna arrays) may operate in frequency bands of n257, n258, and n260 respectively. It should be understood that, even if an operating band of each millimeter wave antenna (or a millimeter wave antenna array) is narrow, through cooperation of the three millimeter wave antennas (or millimeter wave antenna arrays), a general electronic device may also cover a plurality of 5G frequency bands as much as possible, to meet a use requirement of the user based on wireless communication.

To ensure normal operation of the electronic device, components, for example, a battery component, a circuit board component, a camera component, and a speaker component are generally disposed in internal space of the electronic device, to implement functions, for example, power supply, camera shooting, and sound raising. In this way, only small space is reserved inside the electronic device for installing the millimeter wave antenna.

When the camera component includes a plurality of cameras to meet photographing experience of the user, or when the battery component has a large capacitance (an occupied volume is also larger) to improve cruising power, less space is reserved for the millimeter wave antenna. This space may not be well suited for installing a plurality of millimeter wave antennas. It should be understood that the millimeter wave antenna in the general electronic device may need to be selected in performance and the like. This makes the electronic device unable to well support 5G wireless communication to some extent. For example, a broadside direction diagram of the millimeter wave antenna in the electronic device may be unstable, and a lobe is easily generated, or radiation directivity of the antenna is poor.

In addition, considering factors such as a profile and a size of the millimeter wave antenna, an operating band of the millimeter wave antenna applied to the electronic device may be narrower, and the millimeter wave antenna may not cover a frequency band specified in the 5G technology. For example, the millimeter wave antenna is a microstrip patch antenna with a low profile, and a size of the millimeter wave antenna may be $0.4\lambda_0*0.4\lambda_0$, where $\lambda_0$ is a wavelength of an electromagnetic wave in the air at a lowest operating frequency. For example, an operating band corresponding to the microstrip patch antenna is 26.5 GHz to 29 GHz. To be specific, the microstrip patch antenna can cover only a part of frequency bands in n257, and a corresponding relative bandwidth ffoc3=9.0%. Based on this, the general electronic device may need to dispose more millimeter wave antennas, to meet a use requirement of the user.

It should be understood that, based on the foregoing content, in the general electronic device, the millimeter wave antenna of the electronic device may have problems, for example, a large quantity of antennas, a large size, small installation space, a narrow operating band, and an unstable broadside direction. These problems make the electronic device unable to well support a 5G wireless communication technology.

Based on the foregoing problems, refer to FIG. 1. An embodiment of this application provides an example electronic device 10. The electronic device 10 may include a display module 20, a middle frame 30, and a rear cover (not shown in the figure). The middle frame 30 may be located between the display module 20 and the rear cover, and the three roughly determine a three-dimensional outline of the electronic device 10 as a whole. For example, the electronic device 10 is approximately rectangular.

In some embodiments, the display module 20 may be an active light emitting display module, for example, an OLED (Organic Light-Emitting Diode) display module; or the display module 20 may be a passive light emitting display module, for example, an LCD (Liquid Crystal Display) display module. In terms of a presentation form, a display of the display module 20 may be a curved display or a flat display. This is not limited.

In some embodiments, the rear cover may be a glass rear cover, a ceramic rear cover, a metal rear cover, or the like.

The middle frame 30 may be a metal middle frame or a non-metal middle frame. For example, the middle frame 30 is an aluminum alloy middle frame, a magnesium alloy middle frame, or the like.

In some embodiments, the electronic device 10 may further include a millimeter wave antenna 100. The millimeter wave antenna 100 may be installed in the electronic device 10 and disposed on an antenna carrier. For example, the millimeter wave antenna 100 may be located between the display module 20 and the rear cover, and is surrounded by the middle frame 30. It should be understood that the millimeter wave antenna 100 may be disposed on the middle frame 30. It should be understood that in FIG. 1, a location of the millimeter wave antenna 100 in the middle frame 30 is an example. Alternatively, the millimeter wave antenna 100 may be further disposed on the rear cover. Alternatively, the millimeter wave antenna 100 may be disposed on a circuit board. The circuit board may be a part of a circuit board component of the electronic device 10. In some embodiments, the millimeter wave antenna 100 may be further disposed on the display module 20, for example, the display of the display module 20. By disposing the millimeter wave antenna 100 on the display module 20, limited space of the electronic device can be effectively used.

In some embodiments, a type of the electronic device 10 may include an electronic device that can implement a wireless communication function, for example, a mobile phone, a tablet computer, an in-vehicle antenna, an uncrewed aerial vehicle, a home appliance device, a notebook computer, a headset or a receiver device, a keyboard, a mouse, or a wearable device (for example, a smart watch or a smart band). This is not limited in this application. In some other embodiments, the electronic device 10 may alternatively be an in-vehicle navigator, a head mounted display (HMD, Head Mounted Display), a head up display (HUD, Head Up Display), or the like that has a wireless communication function. The head mounted display device may include an AR (Augmented Reality, augmented reality) display device, a VR (Virtual Reality, virtual reality) display device, or an MR (Mixed Reality, mixed reality) display device. The electronic device 10 may be a CPE (Customer Premise Equipment), a wireless access point device (for example, a wireless router), or a base station device.

In some embodiments, the electronic device 10 may further include components, for example, the battery assembly, the circuit board assembly, the camera assembly, and the speaker assembly mentioned above, to implement corresponding functions. This is not limited in this application.

In addition, the electronic device 10 may further include a non-millimeter wave antenna, to correspondingly implement functions, for example, 2G wireless communication, 3G wireless communication, and 4G wireless communication. The non-millimeter wave antenna may include at least one antenna of a monopole antenna, a dipole antenna, a left-handed antenna, an inverted F antenna, a ring antenna, a Yagi antenna, a patch antenna, a slot antenna, or a combination of several antennas.

In some embodiments, by structural improvement, the millimeter wave antenna 100 may have features such as a high gain and miniaturization, to be disposed in the electronic device 10. In addition, the millimeter wave antenna 100 may operate in an ultra-wideband, where the ultra-wideband means that a relative bandwidth of the antenna is greater than 50%. For example, an operating band of an antenna may be 23.5 GHz to 40 GHz. and a corresponding relative bandwidth ffoc4=52.0%. In this case, the antenna may be defined as an ultra-wideband antenna. Alternatively, the millimeter wave antenna 100 may operate in a dual-band or a multiband. This is not limited in this application.

As shown in FIG. 2 to FIG. 9, the following describes the foregoing millimeter wave antenna 100 by using a millimeter wave antenna (100*a*, 100*b*, 100*c*) as an example.

Figure 2:
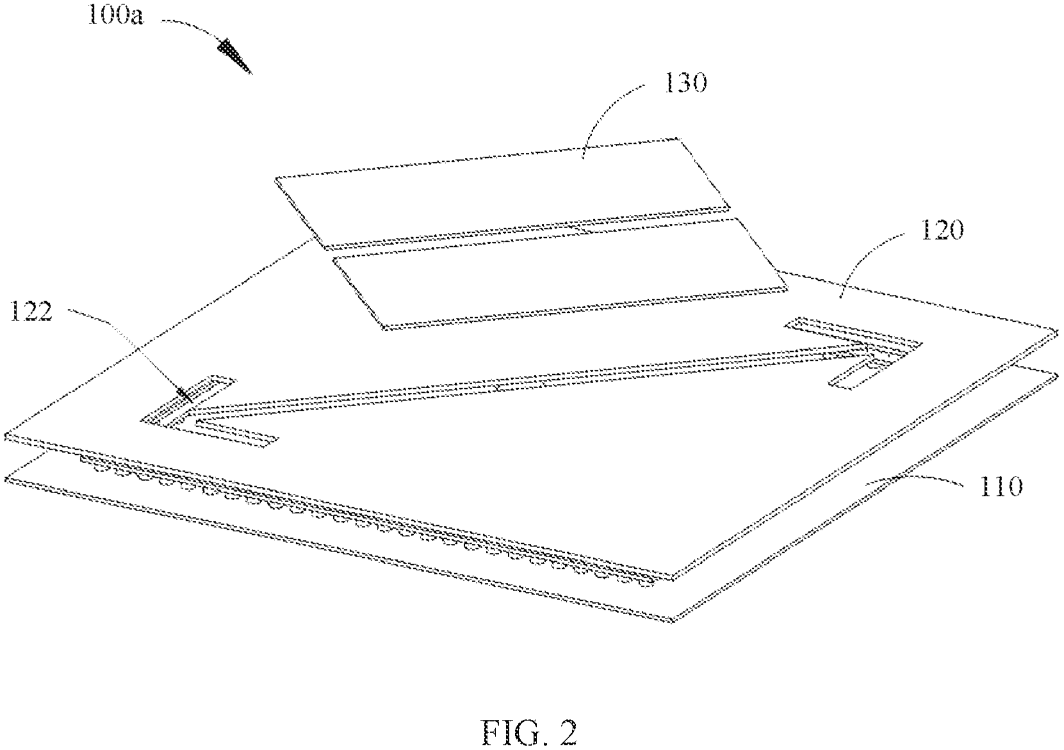
FIG. 2 is a three-dimensional diagram of a millimeter wave antenna according to an embodiment of this application.
Figure 3:
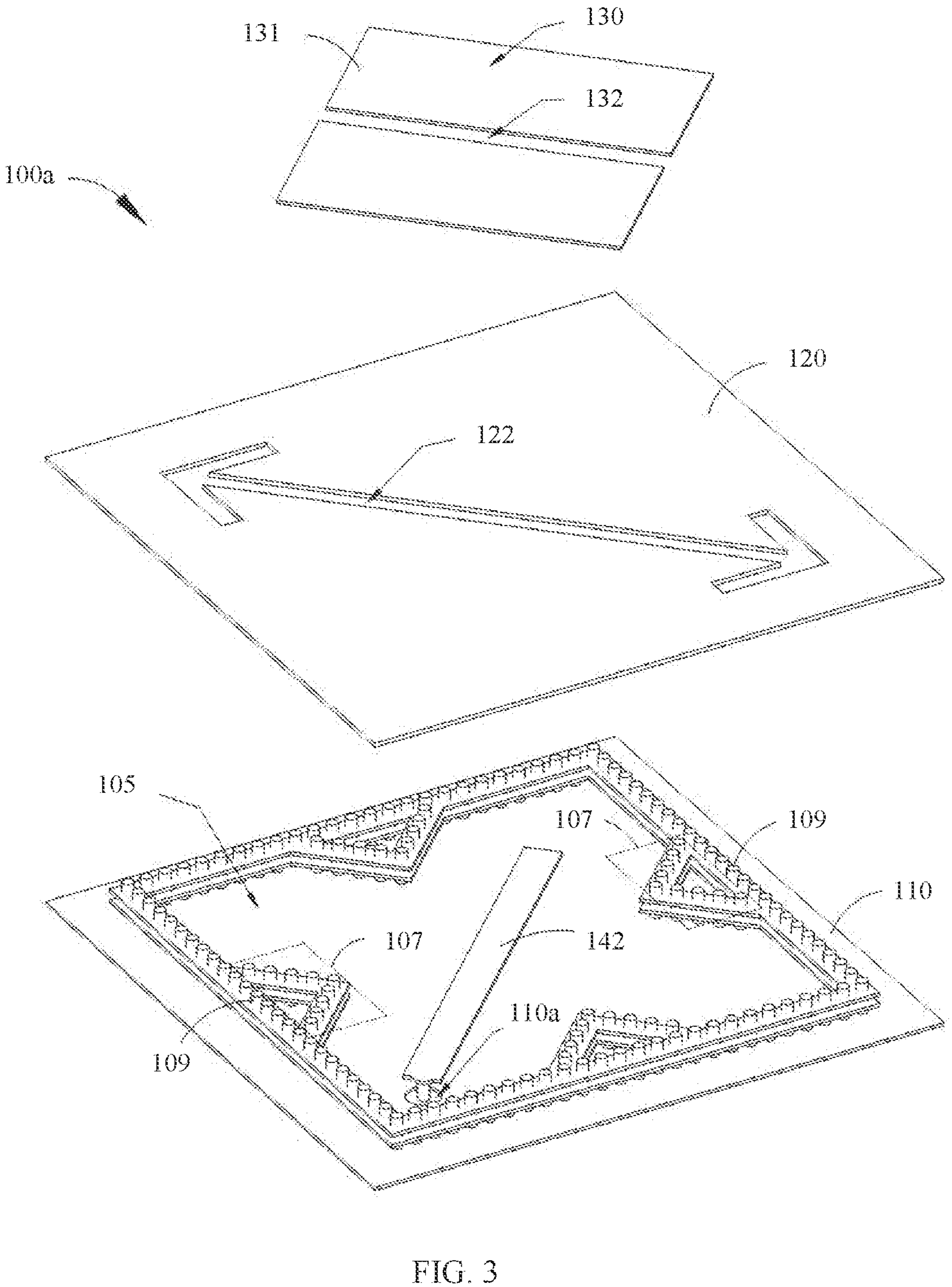
FIG. 3 is an exploded diagram of a millimeter wave antenna according to an embodiment of this application.

Refer to FIG. 2 and FIG. 3. An embodiment of this application provides a millimeter wave antenna 100*a*, including a first metal plate 110, a second metal plate 120, and a radiation patch 130 that are disposed at intervals. A medium (not shown in the figure) may be disposed between the first metal plate 110, the second metal plate 120, and the radiation patch 130. However, for ease of describing a relative relationship between structures, the medium is not presented in corresponding accompanying drawings. The medium may be an LCP (Liquid Crystal Polymer, liquid crystal polymer), a Rogers material, or the like. It should be understood that, when the medium is an LCP, because a loss tangent value of the LCP remains small at a high frequency, the millimeter wave antenna 100*a* may have a small transmission loss, to improve radiant power and obtain a higher antenna gain.

In some other embodiments, the millimeter wave antenna 100*a* may not include a medium, and the first metal plate 110, the second metal plate 120, and the radiation patch 130 may be fastened through a support or the like.

In some embodiments, a medium exists between the first metal plate 110 and the second metal plate 120, the first metal plate 110 and the second metal plate 120 form a cavity 105, and the cavity 105 is an open cavity having only two metal surfaces.

In some embodiments, there are a plurality of vias (not marked) between the first metal plate 110 and the second metal plate 120. The plurality of vias are arranged around, to form the cavity 105 between the first metal plate 110 and the second metal plate 120. The cavity 105 may be filled with a medium. The via, the first metal plate 110, and the second metal plate 120 may form a substrate integrated waveguide (SIW, Substrate Integrated Waveguide) as a whole. Based on this, a higher-order mode between the first metal plate 110 and the second metal plate 120 may be suppressed, to improve efficiency of the millimeter wave antenna 100*a*, and reduce impact of the higher-order mode on each mode of the millimeter wave antenna 100*a*. In addition, compared with a microstrip, the SIW may further improve anti-interference performance of a signal, to improve a signal transmission effect.

It should be understood that the second metal plate 120 may be used as a ground of the millimeter wave antenna 100*a*, and the first metal plate 110 may be short-circuited to the second metal plate 120 through the via. In some other embodiments, when the millimeter wave antenna 100*a* does not include a medium, a corresponding via may be understood as a metal post. It should be understood that what the cavity 105 is shaped like in FIG. 3 is an example. In some embodiments, the cavity 105 may be shaped like at least one or a combination of a plurality of shapes such as a rectangle, a triangle, a circle, and an ellipse.

Refer to FIG. 3. In some embodiments, the millimeter wave antenna 100*a* may include a first feeder 142, and the first feeder 142 is located in the cavity 105. A first slot 122 is disposed on the second metal plate 120 of the cavity 105. The first feeder 142 in the cavity 105 may stimulate the cavity 105 and the first slot 122, so that the millimeter wave antenna 100*a* operates in a first resonance mode, that is, the millimeter wave antenna 100*a* has a first resonance frequency. Corresponding to the first feeder 142, in some embodiments, a first port 110*a* is further disposed on the first metal plate 110 (or the second metal plate 120), and the first port 110*a* may be penetrated by a transmission line (not shown in the figure). It should be understood that a location at which the first port 110*a* is disposed may be set based on an actual requirement, so that the millimeter wave antenna 100*a* has good impedance matching performance. Based on this, the transmission line may be electrically connected to the first feeder 142 (direct contact connection or capacitive coupling connection), to feed the first feeder 142. It should be understood that, the transmission line may include at least one or a combination of a coaxial cable, a strip line, a microstrip, and a waveguide structure. In some other embodiments, the first port 110*a* may not be disposed on the first metal plate 110 (or the second metal plate 120). Correspondingly, a first opening is formed between the vias, and the cavity 105 may be connected to the outside through the first opening. Based on this, the transmission line and the first feeder 142 may be electrically connected through the first opening.

In some embodiments, the first feeder 142 is, for example, a strip line, but is not limited thereto. In some other embodiments, the first feeder 142 may alternatively be a microstrip.

In some embodiments, the first feeder 142 may be a probe (or a conductive metal hole, or a conductive metal post), and the first feeder 142 stimulates the cavity 105 and the first slot 122, so that the millimeter wave antenna 100*a* operates in the first resonance mode.

Refer to FIG. 2 and FIG. 3. When the cavity 105 is, for example, a rectangle, the first slot 122 may be disposed along a diagonal of the cavity 105 (for example, disposed at +45° or −45°). Based on this, a diagonal size of the cavity 105 may be fully used, and a longer-length first slot 122 may be obtained in a limited cavity area, so that the second metal plate 120 may have a smaller area, to implement miniaturization of the millimeter wave antenna 100*a*. In some embodiments, the cavity 105 may internally include a via 107 (or a metal post) used to adjust impedance matching. For example, in FIG. 3, metal walls around a rectangular SIW cavity 105 are formed by vias, and some vias 109 on the metal walls around a rectangular SIW and matching vias 107 form a triangle. It should be understood that each metal wall of the rectangular SIW includes some vias 109 and matching vias 107.

In some embodiments, the SIW cavity 105 may not be disposed with some vias 109, but includes the matching via 107. When impedance matching is implemented, the matching via 107 forms the metal walls around the SIW cavity 105 that is approximately a rectangle, to suppress formation of the higher-order mode. This is not limited.

In some other embodiments, a length direction or a width direction of the cavity 105 may be set along a diagonal of the second metal plate 120. Alternatively, the length direction or the width direction of the cavity 105 may be set along a diagonal of the first metal plate 110.

In addition, in some embodiments, to reduce a size of the millimeter wave antenna 100*a* to implement miniaturization, for example, the first slot 122 is in an arrow shape. It should be understood that, compared with a strip-shaped slot of a same length, the first slot 122 in the arrow shape may have a longer current path. In addition to meeting a requirement of a specific resonance frequency, the second metal plate 120 that carries the first slot 122 may have a smaller size.

In some other embodiments, the first slot 122 may alternatively be rectangular, H-shaped, dumbbell-shaped, butterfly-shaped, or the like. This is not limited.

It should be understood that, based on the first resonance mode of the first slot 122, the millimeter wave antenna 100*a* may have a specific operating band, for example, may basically cover a frequency band specified in a 5G technology. In addition, by cooperating with a structure, for example, the radiation patch 130, the millimeter wave antenna 100*a* may alternatively operate in another mode, to improve a relative bandwidth of the millimeter wave antenna 100*a*.

In some embodiments, in addition to generating the first resonance mode by cooperating with the cavity 105, the first slot 122 may further implement coupling feed to the radiation patch 130. Refer to FIG. 2 and FIG. 3, for example, the radiation patch 130 includes two patch elements 131, and the two patch elements 131 are loaded (Loading) through a first patch slot 132. It should be understood that based on coupling feed of the first slot 122, the radiation patch 130 may generate a second resonance mode, that is, the millimeter wave antenna 100*a* has a second resonance frequency. The second resonance mode may be a $TM_{10}$ mode of the radiation patch 130, and the second resonance frequency may be greater than the first resonance frequency. Based on this, the operating band of the millimeter wave antenna 100*a* can be extended.

In the millimeter wave antenna 100*a* provided in embodiments of this application, based on a loading effect of the first patch slot 132 on the radiation patch 130, the radiation patch 130 may further generate a third resonance mode by implementing coupling feed to the radiation patch 130 through the first slot 122, that is, the millimeter wave antenna 100*a* has a third resonance frequency. The third resonance mode may be a phase-inverted $TM_{20}$ mode of the radiation patch 130, and the third resonance frequency is greater than the second resonance frequency. Based on this, through cooperation between structures, for example, the first metal plate 110, the second metal plate 120, and the radiation patch 130, the operating band of the millimeter wave antenna 100*a* can be further extended, to improve a wireless communication effect of the millimeter wave antenna 100*a*.

In some embodiments, different from the $TM_{20}$ mode, based on the phase-inverted $TM_{20}$ mode, magnetic flow directions of two radiation edges of the radiation patch 130 are the same, current directions are opposite, and a maximum radiation direction is perpendicular to a surface of the radiation patch 130. Based on this, energy of the radiation patch 130 on the two radiation sides can be superimposed, to have a characteristic of broadside radiation. However, based on the characteristic of broadside radiation, the radiation patch 130 operating in the third resonance mode can reduce a possibility of generating a lobe, that is, a radiation direction diagram of the radiation patch 130 operating in the phase-inverted $TM_{20}$ mode is relatively symmetric, to overcome a path loss to some extent, and improve a radiation gain of the millimeter wave antenna 100*a*.

In some embodiments, the first slot 122 is parallel to the first patch slot 132, to better implement coupling feed to the radiation patch.

In some embodiments, to further extend a bandwidth and obtain a higher radiation gain, the radiation patch 130 may be connected to the second metal plate 120 through vias, where the vias are separately located on two sides of a width direction of the first slot 122.

In some embodiments, for example, the radiation patch 130 is rectangular, but this is not limited thereto. In some other embodiments, the radiation patch 130 may alternatively be symmetric, for example, circular, ring-shaped, fan-shaped, or diamond-shaped. For example, the patch element 131 is rectangular, and the radiation patch 130 is rectangular or square. Alternatively, the patch element 131 is fan-shaped, and the radiation patch 130 is fan-shaped or circular. Alternatively, the patch element 131 is triangular, and the radiation patch 130 is square.

In some embodiments, a surface that is of the first metal plate 110 and that faces the second metal plate 120 is used as a reference plane, the first feeder 142 is a strip line or a microstrip, and a projection of the first feeder 142 on the reference plane is perpendicular to a projection of the first slot 122 on the reference plane. Based on this, the first feeder may better feed the radiation patch 130 through the first slot 122, and impedance matching is better. In addition, the projection of the first feeder 142 on the reference plane may also be perpendicular to a projection of the first patch slot 132 on the reference plane. Because a slot, for example, the first slot 122 and the first patch slot 132 needs to be carried by a physical structure, in some cases, it may also be understood that the projection of the first feeder 142 on the reference plane is perpendicular to a part of the physical structure corresponding to a slot. For example, the first slot 122 is carried on the second metal plate 120, and the projection of the first feeder 142 on the reference plane may be perpendicular to a part of the second metal plate 120 that forms the first slot 122. For another example, the first patch slot 132 is formed by patch elements 131 disposed at intervals, and the projection of the first feeder 142 on the reference plane may be perpendicular to an edge that is of the patch elements 131 and that is corresponding to the first patch slot 132.

In some embodiments, based on cooperation between structures, for example, the first metal plate 110, the second metal plate 120, and the radiation patch 130, the millimeter wave antenna 100*a* may selectively operate in the first resonance mode, the second resonance mode, or the third resonance mode based on a required operating frequency. In some cases, the electronic device 10 to which the millimeter wave antenna 100*a* is applied may enable the millimeter wave antenna 100*a* to operate in a corresponding mode based on an actual communication requirement, to be applicable to different wireless communication scenarios.

In some embodiments, operating bands of the first resonance mode, the second resonance mode, and the third resonance mode may be discontinuous, that is, the millimeter wave antenna 100*a* may operate in a plurality of independent frequency bands. For example, an operating band of the first resonance mode may be 23.5 GHz to 27 GHz, an operating band of the second resonance mode may be 29 GHz to 36 GHz, and an operating band of the third resonance mode may be 38 GHz to 41.5 GHz.

In some other embodiments, the first resonance mode, the second resonance mode, and the third resonance mode may be combined, that is, the operating bands of the three modes are a continuous frequency band as a whole, and the relative bandwidth of the millimeter wave antenna 100*a* is wide. Based on this, the millimeter wave antenna 100*a* may operate in a wide frequency band. For example, the operating band of the first resonance mode may be 23.5 GHz to 28 GHz, the operating band of the second resonance mode may be 28 GHz to 37 GHz, and the operating band of the third resonance mode may be 37 GHz to 41.5 GHz. The operating bands of the first resonance mode, the second resonance mode, and the third resonance mode are a continuous frequency band as a whole. Correspondingly, a frequency band that can be covered by the millimeter wave antenna 100*a* as a whole is 23.5 GHz to 41.5 GHz.

In addition, the operating bands of the first resonance mode and the second resonance mode may be continuous, but the operating band of the third resonance mode is not continuous with the operating band of the second resonance mode; or the operating bands of the second resonance mode and the third resonance mode are continuous, but the operating band of the first resonance mode is not continuous with the operating band of the second resonance mode.

It should be understood that the first metal plate 110, the second metal plate 120, and the radiation patch 130 are all a layer structure with a small thickness, and another structure, for example, the first feeder 142 is located between layer structures. To be specific, a volume of the millimeter wave antenna 100*a* is mainly determined by sizes and relative relationships of the first metal plate 110, the second metal plate 120, and the radiation patch 130. Therefore, the millimeter wave antenna 100*a* provided in embodiments of this application may have a small size. The volume of the millimeter wave antenna 100*a* may be $0.24\lambda_0*0.24\lambda_0*0.07\lambda_0$. $\lambda_0$ is a wavelength of an electromagnetic wave in the air at a lowest operating frequency. Correspondingly, to the millimeter wave antenna 100*a* provided in embodiments of this application, $\lambda_0$ may include 6 mm to 13 mm. For example, $\lambda_0$ is 7 mm, 8 mm, 9 mm, 10 mm, 11 mm, or 12 mm.

It should be understood that, it can be learned from the foregoing content that, even compared with a microstrip patch antenna with a small size (for example, the size is $0.4\lambda_0*0.4\lambda_0$), the millimeter wave antenna 100*a* provided in embodiments of this application may have a smaller size (for example, $0.24\lambda_0<0.4\lambda_0$). Based on this, miniaturization of the millimeter wave antenna 100*a* may be implemented, to reduce a volume occupied in the electronic device 10, and facilitate installation in the electronic device 10.

Figure 4:
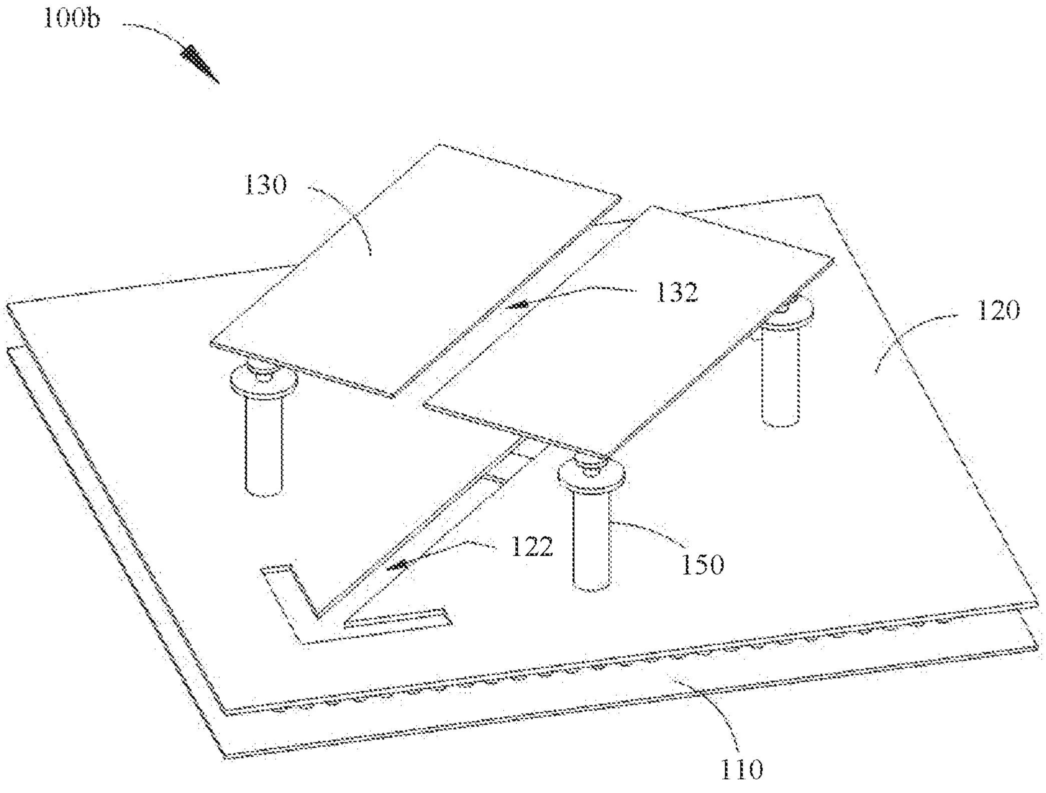
FIG. 4 is a three-dimensional diagram of a millimeter wave antenna according to another embodiment of this application.
Figure 5:
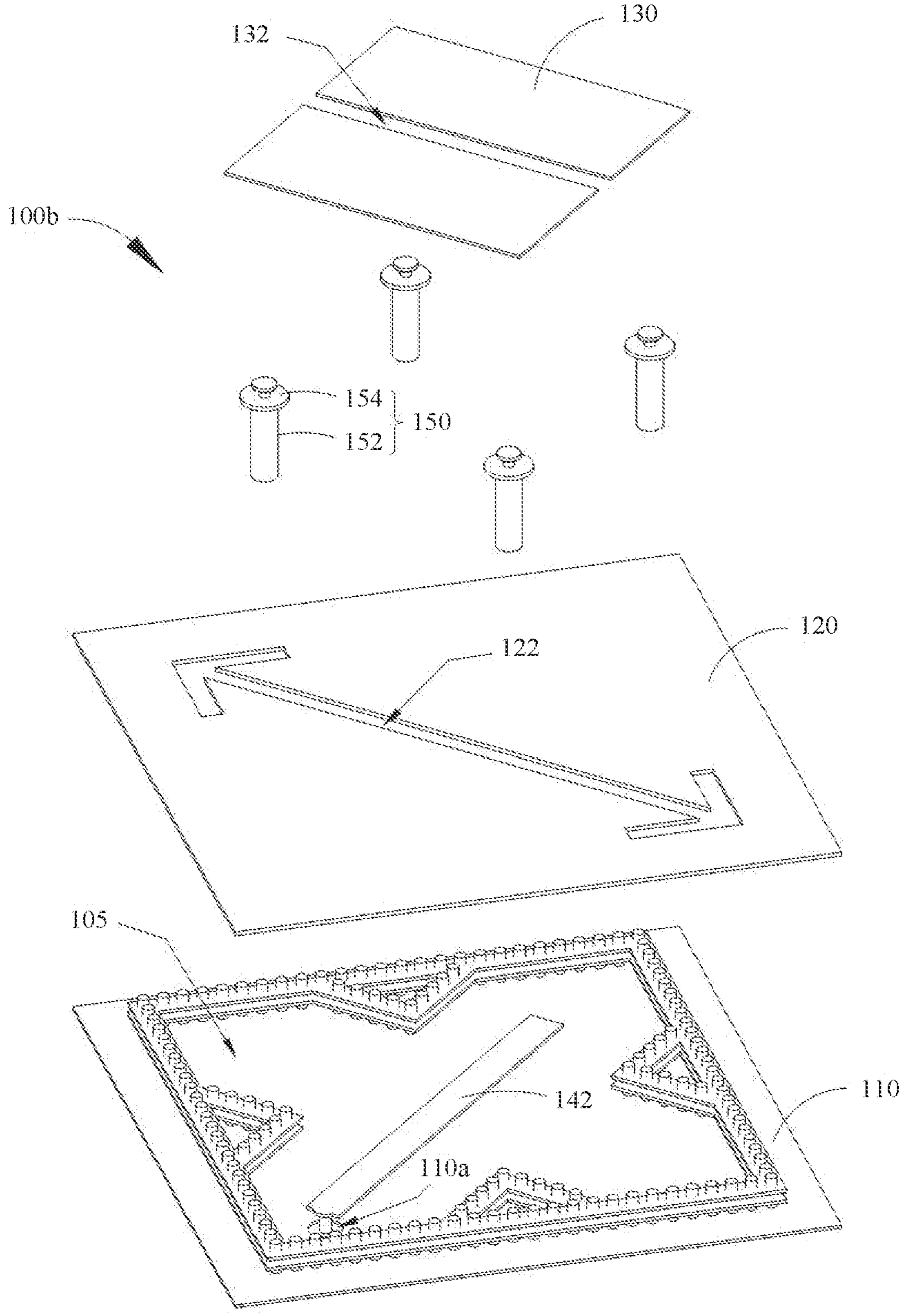
FIG. 5 is an exploded diagram of a millimeter wave antenna according to another embodiment of this application.

Refer to FIG. 4 and FIG. 5. To extend antenna bandwidth to improve a wireless communication effect, an embodiment of this application further provides another millimeter wave antenna 100*b*. Compared with the millimeter wave antenna 100*a* provided in FIG. 2 and FIG. 3, the millimeter wave antenna 100*b* may further include a parasitic metal post 150, and the parasitic metal post 150 is located between the second metal plate 120 and the radiation patch 130. It should be understood that, based on coupling feed of the first slot 122, the parasitic metal post 150 may cooperate with the radiation patch 130 to generate a fourth resonance mode, so that the millimeter wave antenna 100*b* has the fourth resonance frequency. The fourth resonance frequency may be greater than the third resonance frequency. Based on this, the millimeter wave antenna 1000*b* may have four modes, to more comprehensively cover a frequency band specified in the 5G technology.

In some embodiments, there are a plurality of parasitic metal posts 150, and the plurality of parasitic metal posts 150 are arranged on the second metal plate 120 at intervals, and are located around the radiation patch 130.

Refer to FIG. 5. In some embodiments, each parasitic metal post 150 may include a post body 152 and a pad 154 for ease of processing. It should be understood that, on a premise that the fourth resonance mode is generated and the corresponding fourth resonance frequency exists, a specific structure and a specific parameter of the parasitic metal post 150 are not limited in embodiments of this application. The parameter may be, for example, a diameter and a height of the post body 152, or a height of the pad 154.

Figure 6:
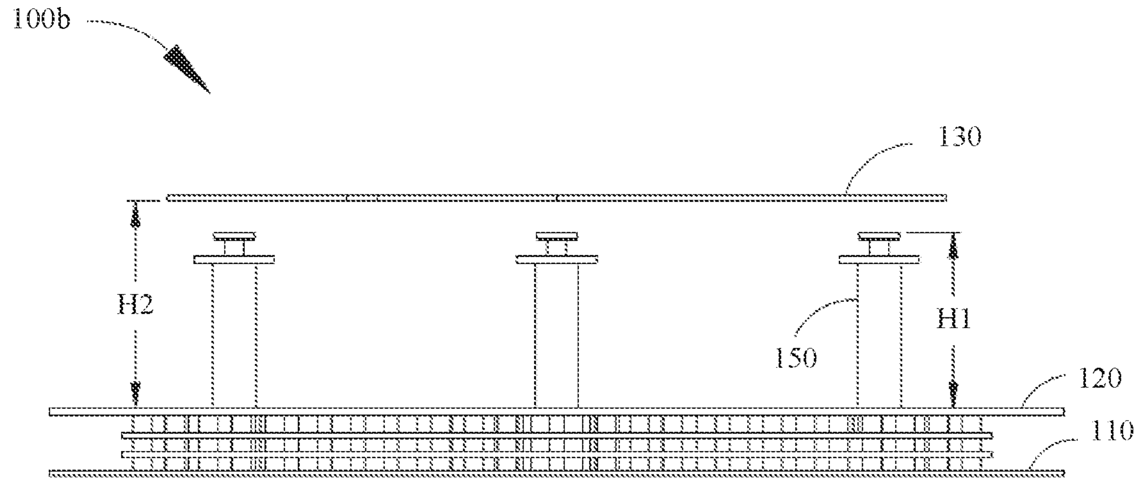
FIG. 6 is a diagram of a side view of a millimeter wave antenna according to another embodiment of this application.
Figure 7:
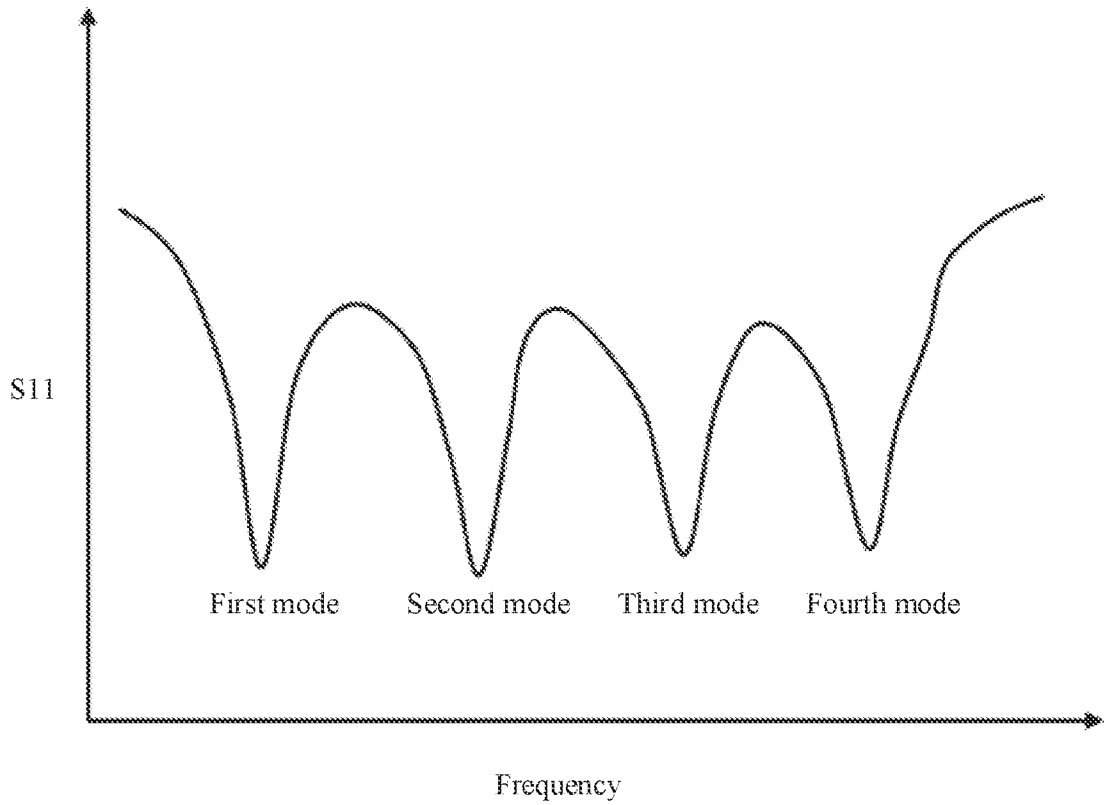
FIG. 7 is a data diagram in which a reflection coefficient of a millimeter wave antenna varies with a frequency according to another embodiment of this application.

Refer to FIG. 6, in some embodiments, the height H1 of the parasitic metal post 150 may be less than or equal to a shortest distance H2 between the second metal plate 120 and the radiation patch 130. Therefore, the parasitic metal post 150 does not affect an overall height of the millimeter wave antenna 100*b*, that is, the height of the millimeter wave antenna 100*b* is mainly determined by a distance between the first metal plate 110 and the radiation patch 130. Compared with the millimeter wave antenna 100*a* provided in FIG. 2 and FIG. 3, the millimeter wave antenna 100*b* does not increase a volume of the millimeter wave antenna 100*b* while increasing the fourth resonance mode, to implement miniaturization of the antenna.

In some embodiments, a surface of the first metal plate 110 is used as a reference plane, and a projection of the parasitic metal post 150 on the reference plane may be located in a projection of the radiation patch 130 on the reference plane. Alternatively, the projection of the parasitic metal post 150 on the reference plane partially overlaps the projection of the radiation patch 130 on the reference plane. Alternatively, the projection of the parasitic metal post 150 on the reference plane is separated from the projection of the radiation patch 130 on the reference plane, that is, the two projections do not overlap each other.

As shown in FIG. 4 and FIG. 5, for example, a quantity of parasitic metal posts 150 is four, and the four parasitic metal posts 150 are disposed at intervals and surround the radiation patch 130. For example, the radiation patch 130 is rectangular, and the radiation patch 130 has four corners. The four parasitic metal posts 150 may be disposed at the four corners of the radiation patch 130. The surface of the first metal plate 110 is used as the reference plane, and a projection of the corner of the radiation patch 130 on the reference plane is located in the projection of the parasitic metal post 150 on the reference plane.

Refer to FIG. 4 to FIG. 7. In some embodiments, the millimeter wave antenna 100*b* is used as an example, a resonance frequency of the first resonance mode generated by the cavity 105 and the first slot 122 may be adjusted based on a volume of the cavity 105, a type and a size of the first slot 122, and the like. For the second resonance mode and the third resonance mode generated by the radiation patch 130, a resonance frequency of the second resonance mode may be adjusted based on the shape and a size of the radiation patch 130, and a resonance frequency of the third resonance mode may be adjusted based on the shape and the size of the radiation patch 130, the size of the first slot 122, and the like. A resonance frequency of the fourth resonance mode generated by the parasitic metal post 150 and the radiation patch 130 may be adjusted based on the height and a location of the parasitic metal post 150, and the like. Based on the foregoing adjustment, the millimeter wave antenna 100*b* provided in embodiments of this application may operate in a frequency band of 23.5 GHz to 44.2 GHz, and a relative bandwidth ffoc5=61.1%. The millimeter wave antenna 100*b* is an ultra-wideband antenna, and can basically continuously cover frequency bands of n257 to n261.

In addition, the millimeter wave antenna 100*b* provided in embodiments may operate in a dual-band or a multiband, that is, the millimeter wave antenna 100*b* may be a dual-band antenna or a multiband antenna. For example, the first resonance mode and the second resonance mode may be combined, and the third resonance mode and the fourth resonance mode may also be combined, so that the millimeter wave antenna 100*b* operates in the dual-band.

Figure 8:
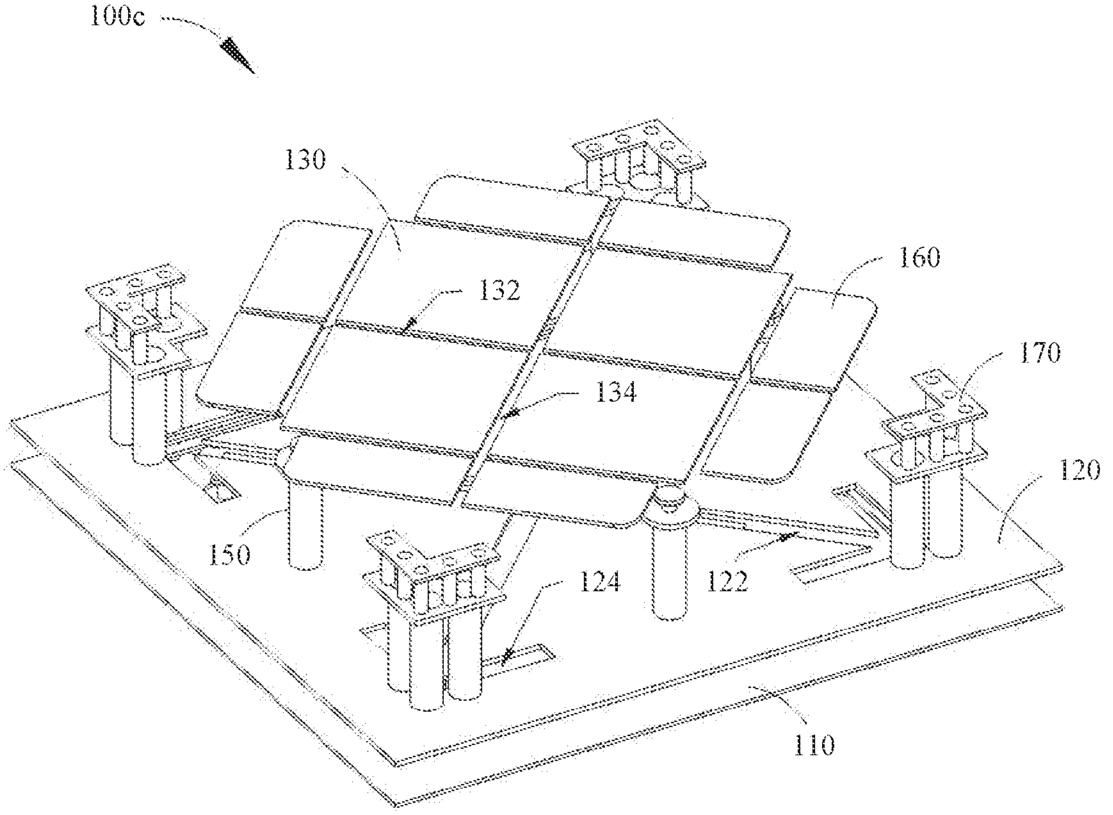
FIG. 8 is a three-dimensional diagram of a millimeter wave antenna according to still another embodiment of this application.
Figure 9:
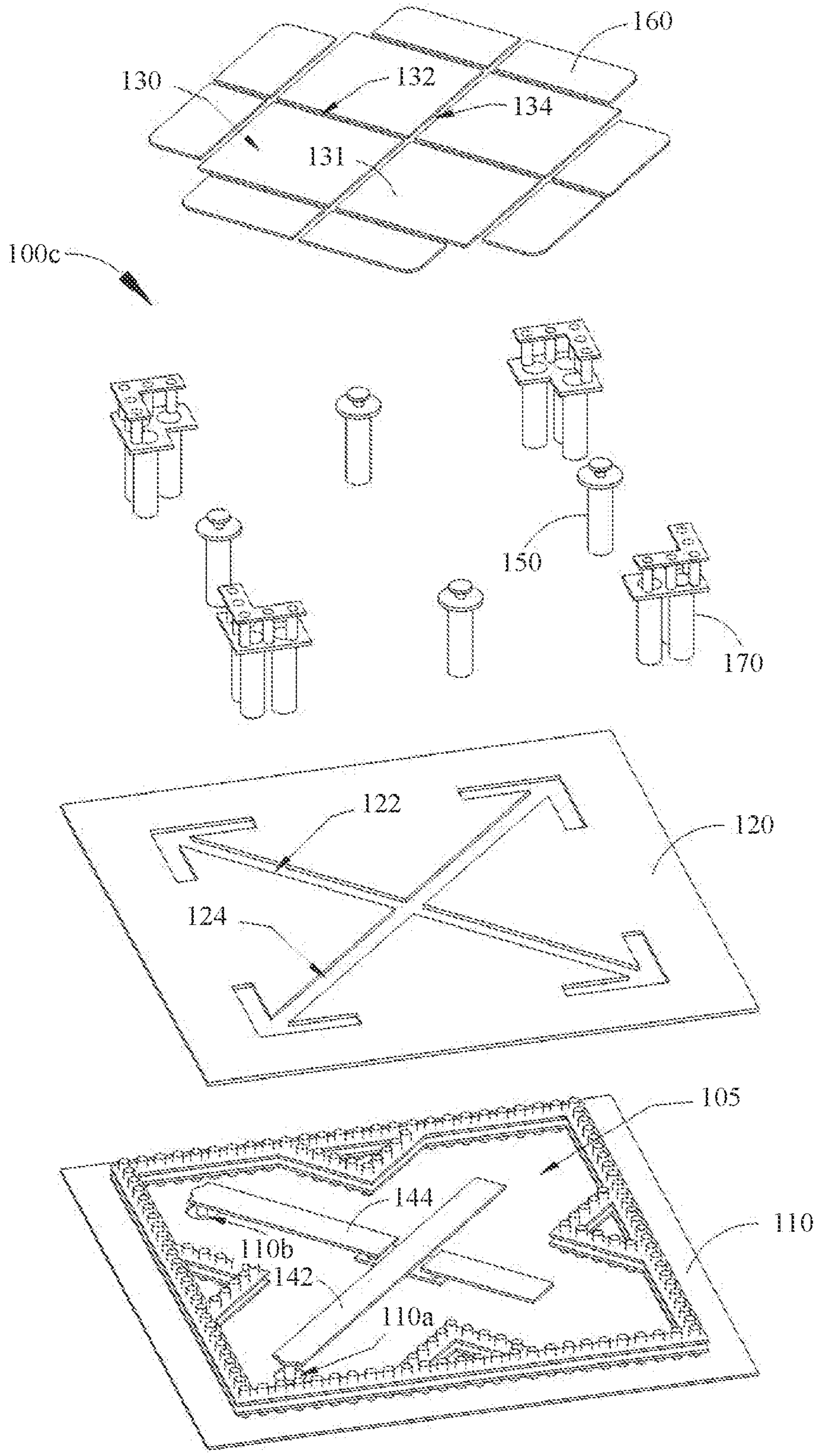
FIG. 9 is an exploded diagram of a millimeter wave antenna according to still another embodiment of this application.

In the foregoing example, the millimeter wave antenna (100*a*, and 100*b*) provided in embodiments of this application may be a single polarization antenna, but this is not limited thereto. Refer to FIG. 8 and FIG. 9. An embodiment of this application further provides a millimeter wave antenna 100*c* that can implement dual polarization. Compared with the millimeter wave antenna 100*b* provided in FIG. 4 to FIG. 6, the millimeter wave antenna 100*c* may further include a second feeder 144 (for example, a probe, a microstrip, or a strip line). In some embodiments, when the second feeder and the first feeder are microstrips or strip lines, the second feeder and the first feeder may be intersected (for example, perpendicular), for example, the second feeder 144 may be perpendicular to the first feeder 142. Corresponding to the second feeder 144, a second port 110*b* is disposed on the first metal plate 110, and the second port 110*b* may also be penetrated by a transmission line, to correspondingly implement feed to the second feeder 144. It should be understood that, based on the first port 110*a* and the second port 110*b*, both the first feeder 142 and the second feeder 144 may stimulate the foregoing four modes. The first feeder 142 may be configured to implement +45° polarization of the millimeter wave antenna 100*c*, and the second feeder 144 may be configured to implement −45° polarization of the millimeter wave antenna 100*c*.

In some other embodiments, the second port 110*b* may not be disposed on the first metal plate 110. A second opening is formed between vias, and the cavity 105 may be connected to outside through the second opening. Based on this, the transmission line may be electrically connected to the second feeder 144 through the second opening.

In some embodiments, the first feeder 142 and the second feeder 144 may be intersected (for example, perpendicular). In a part in which the second feeder 144 and the first feeder 142 are intersected (for example, perpendicular), the first feeder 142 or the second feeder 144 may implement avoidance design by a jumper or by spacing the first feeder 142 or the second feeder 144. As shown in FIG. 9, the second feeder 144 may avoid contact with the first feeder 142 by the jumper, to ensure normal operation of the first feeder 142 and the second feeder 144.

In some embodiments, a second slot 124 is further disposed on the second metal plate 120. The second slot 124 is perpendicular to the first slot 122. Based on this, the first slot 122 and the second slot 124 may be used as a cross slot antenna as a whole, to implement dual polarization.

In some embodiments, the radiation patch 130 includes a plurality of patch elements 131. The plurality of patch elements 131 are disposed at intervals, and the plurality of patch elements 131 are loaded through the first patch slot 132 and the second patch slot 134. It should be understood that, based on coupling feed of the first slot 122 and the second slot 124, the radiation patch 130 may also implement dual polarization.

Refer to FIG. 8 and FIG. 9. In some embodiments, the millimeter wave antenna 100*c* may further include a parasitic patch 160. There are a plurality of parasitic patches 160, and the plurality of parasitic patches 160 are arranged around the radiation patch 130, to broaden a frequency band of the millimeter wave antenna 100*c* and increase an antenna aperture. As shown in FIG. 9, there are four patch elements 131, and the patch elements 131 are approximately arranged in a grid structure. There are eight parasitic patches 160, and the eight parasitic patches 160 are arranged regularly around the four patch elements 131.

Refer to FIG. 8 and FIG. 9. In some embodiments, based on a miniaturization requirement, sizes of the first metal plate 110 and the second metal plate 120 need to be as small as possible. However, small sizes of the two metal plates (110, and 120) are not beneficial to impedance matching of the antenna, thereby affecting performance of the antenna. In this case, the millimeter wave antenna 100*c* may further include a matching metal post 170. The matching metal post 170 is disposed on the second metal plate 120 and is far away from the first metal plate 110. It should be understood that the matching metal post 170 may be disposed close to an edge of the second metal plate 120, and is electrically connected to the second metal plate 120. For example, the matching metal post 170 may surround the edge of the second metal plate 120. Based on this, the matching metal post 170 may increase current paths of the two metal plates (110, and 120), and equivalently increase the sizes of the two metal plates (110, and 120). To be specific, the matching metal post 170 may be configured to tune impedance of the millimeter wave antenna 100*c*, to implement impedance matching. Correspondingly, the sizes of the two metal plates (110, and 120) may be reduced, to implement miniaturization of the millimeter wave antenna 100*c*.

In some embodiments, for example, there are four matching metal posts 170, and the four matching metal posts 170 may be disposed at ends of the first slot 122 and the second slot 124. For example, two matching metal posts 170 may be correspondingly disposed at two ends of the first slot 122, and other two matching metal posts 170 may be correspondingly disposed at two ends of the second slot 124. Corresponding disposition may be understood as that the matching metal post 170 is located in an extension line direction of the slots (122, and 124).

In some embodiments, the millimeter wave antennas (100*a*, 100*b*, and 100*c*) may have at least one of a symmetry plane and a rotational symmetry axis. When the millimeter wave antenna includes both the rotational symmetry axis and the symmetry plane, the rotational symmetry axis is located in the symmetry plane. When there are a plurality of symmetry planes of the millimeter wave antennas (100*a*, 100*b*, and 100*c*), the plurality of symmetry planes jointly intersect the rotational symmetry axis.

It should be understood that, based on a symmetric antenna structure, processing of the millimeter wave antennas (100*a*, 100*b*, and 100*c*) may be facilitated, and volumes of the millimeter wave antennas (100*a*, 100*b*, and 100*c*) may be reduced. For example, when a height remains unchanged, the sizes of the first metal plate 110 and the second metal plate 120 may be reduced, to implement miniaturization of the millimeter wave antennas (100*a*. 100*b*, and 100*c*).

An embodiment of this application provides an antenna array. An antenna element of the antenna array is the millimeter wave antenna provided in embodiments of this application. It should be understood that a quantity of antenna elements forming the antenna array is not limited. To be specific, there may be one, two, or more antenna elements.

This application further provides an apparatus. The apparatus includes a radio frequency module and the millimeter wave antenna provided in embodiments. The radio frequency module may include at least one of a filter, a switch, a low noise amplifier, and a power amplifier.

In addition, this application further provides an antenna module. The antenna module may be a module based on an AiP (AiP, Antenna-in-Package) solution, a module based on an AoP (Antenna-on-Package) solution, a module based on an AiM (Antenna in Module) solution, or a module based on an AoC (Antenna-on-Chip) solution. The antenna module based on the AiP solution includes a package, a chip, and the millimeter wave antennas (100*a*, 100*b*, and 100*c*) in the foregoing embodiments. The millimeter wave antennas (100*a*, 100*b*, and 100*c*) is electrically connected to the chip, and is packaged through the package. The package may be a plastic packaging material. In addition, the chip may also be replaced with a radio frequency circuit, which is not limited.

Figure 10:
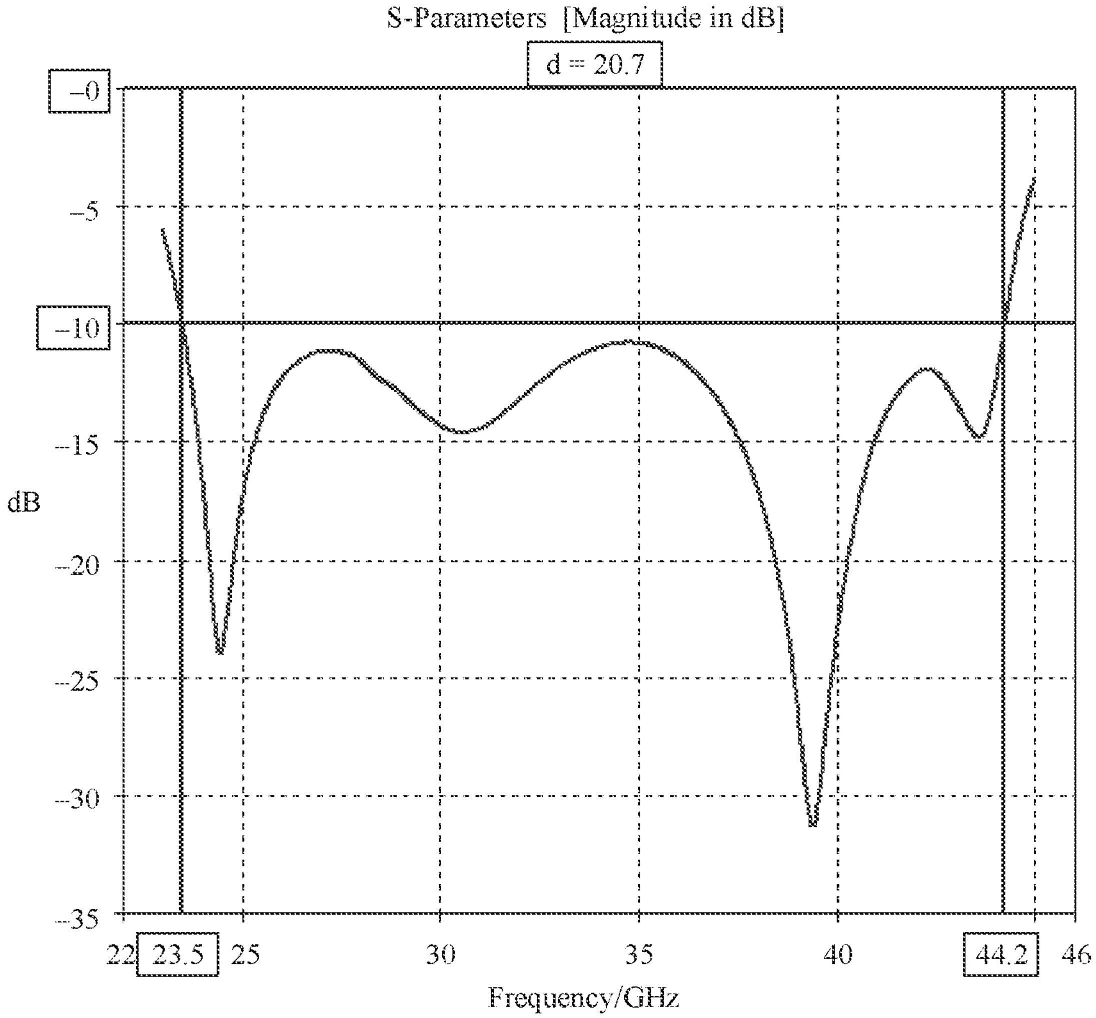
FIG. 10 is a data diagram in which a reflection coefficient of an ultra-wideband millimeter wave antenna varies with a frequency.

FIG. 10 is a data diagram in which a reflection coefficient of an ultra-wideband millimeter wave antenna varies with a frequency. Refer to FIG. 10. In some embodiments, the millimeter wave antenna may combine four modes, so that the millimeter wave antenna has a continuous operating band. As shown in FIG. 10, a frequency band that is of the millimeter wave antenna and whose reflection coefficient is less than −10 dB is 23.5 GHz to 44.2 GHz, and a corresponding relative bandwidth is 61.1%. It should be understood that the frequency band whose reflection coefficient is less than −10 dB is an operating band of the millimeter wave antenna.

Figure 11:
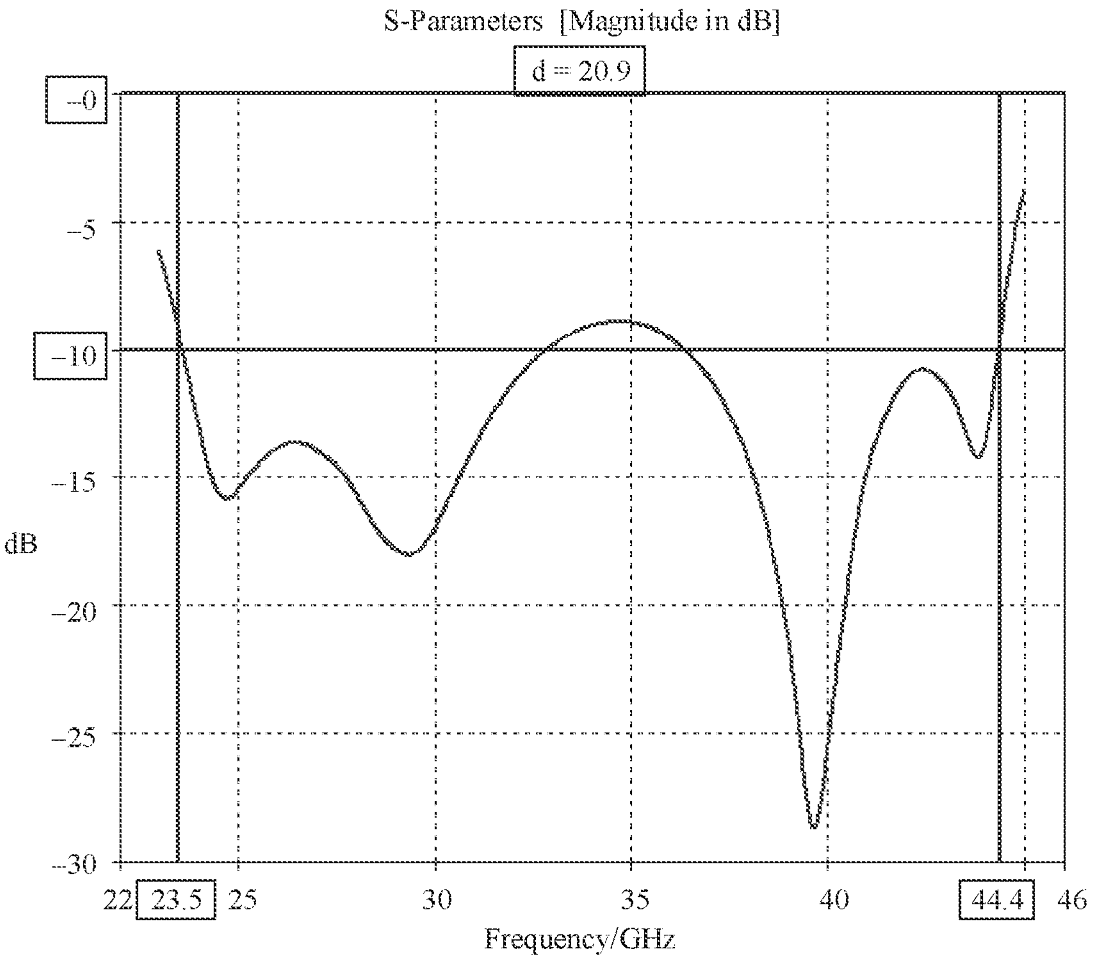
FIG. 11 is a data diagram in which a reflection coefficient of a dual-wideband millimeter wave antenna varies with a frequency.

FIG. 11 is a data diagram in which a reflection coefficient of a dual-wideband millimeter wave antenna varies with a frequency. Refer to FIG. 11. In some embodiments, the millimeter wave antenna may combine a first resonance mode and a second resonance mode, and combine a third resonance mode and a fourth resonance mode, so that the millimeter wave antenna has two operating bands.

Figure 12:
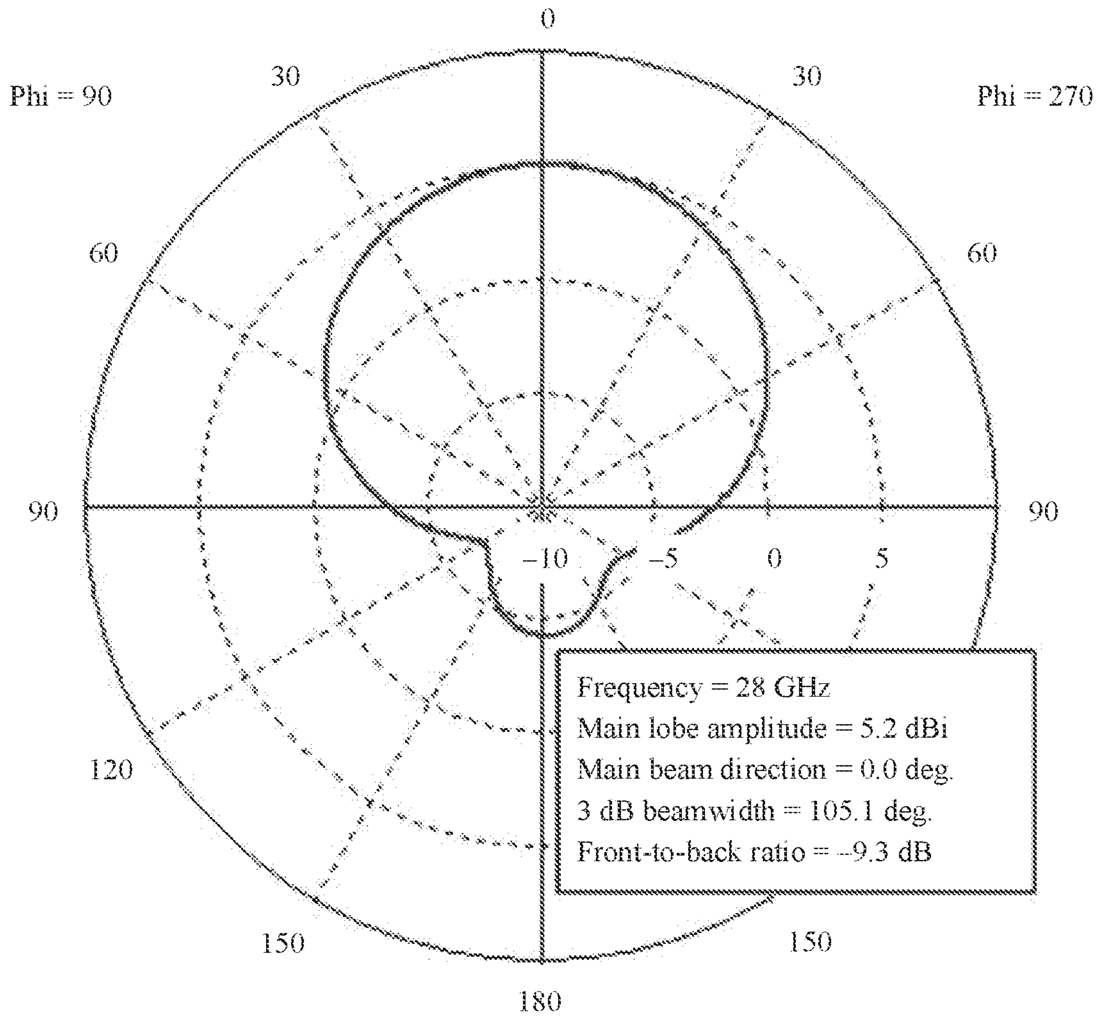
FIG. 12 and FIG. 13 are two-dimensional radiation direction diagrams of a millimeter wave antenna at 28 GHz.
Figure 13:
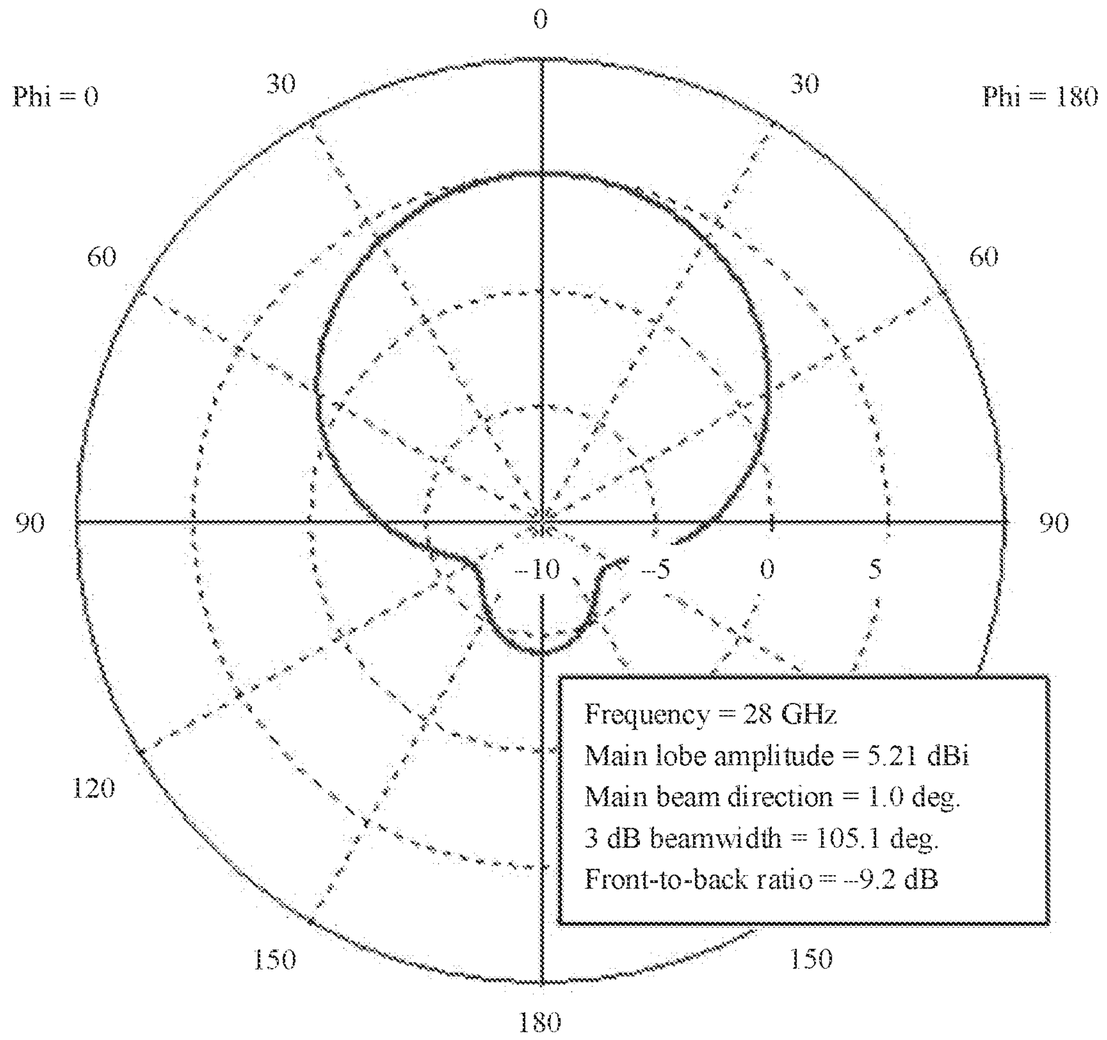

FIG. 12 and FIG. 13 are two-dimensional radiation direction diagrams of a millimeter wave antenna at 28 GHz. Refer to FIG. 12 and FIG. 13. The millimeter wave antenna provided in embodiments may have a symmetric radiation direction diagram, to overcome a path loss to some extent and improve a radiation gain of the millimeter wave antenna.

Figure 14:
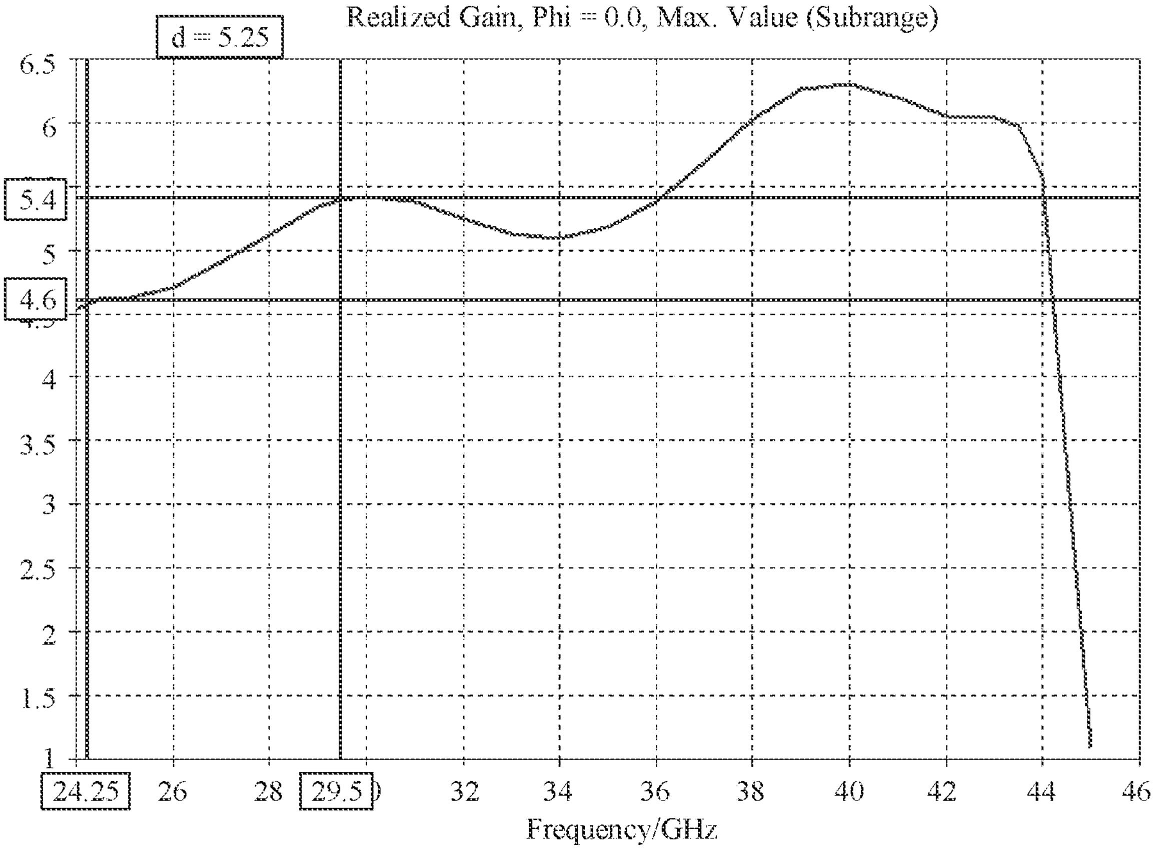
FIG. 14 is a data diagram in which a gain of a millimeter wave antenna varies with a frequency.

FIG. 14 is a data diagram in which a gain of a millimeter wave antenna varies with a frequency. Refer to FIG. 12, FIG. 13, and FIG. 14. In some embodiments, because all four modes of the millimeter wave antenna have a stable and symmetric radiation direction diagram, the millimeter wave antenna may have a stable gain in an operating band. As shown in FIG. 14, for example, the millimeter-wave antenna has a gain greater than 4.6 dBi in a frequency band of 24.25 GHz to 43.5 GHz.

The foregoing descriptions are merely specific implementations of this application. It should be noted that a person of ordinary skill in the art may make several improvements or polishing without departing from the principle of this application and the improvements or polishing shall fall within the protection scope of this application.

What is claimed is:

1. A millimeter wave antenna comprising:

a first metal plate;

at least one via;

a second metal plate electrically coupled to the first metal plate through the at least one via and comprising a first slot;

a cavity formed by the first metal plate and the second metal plate;

a first feeder disposed in the cavity to feed the cavity;

a radiation patch comprising at least two patch elements;

a plurality of parasitic patches arranged around the radiation patch; and a first patch slot formed between the at least two patch elements, wherein the first metal plate, the second metal plate, and the radiation patch are arranged in a stack manner, wherein the first slot is configured to feed the radiation patch, and wherein the cavity is a rectangle, and wherein the first slot is disposed along a diagonal of the cavity.

2. The millimeter wave antenna of claim 1, wherein the first metal plate, the second metal plate, and the at least one via are configured to enclose the cavity.

3. The millimeter wave antenna of claim 1, wherein the first slot is arrow-shaped, rectangular, H-shaped, dumbbell-shaped, or butterfly-shaped.

4. The millimeter wave antenna of claim 1, wherein the radiation patch is rectangular, circular, ring-shaped, fan-shaped, or diamond-shaped.

5. The millimeter wave antenna of claim 1, further comprising a parasitic metal post disposed on the second metal plate and surrounds the radiation patch.

6. The millimeter wave antenna of claim 5, wherein a height of the parasitic metal post is less than or equal to a shortest distance between the second metal plate and the radiation patch.

7. The millimeter wave antenna of claim 5, wherein the second metal plate further comprises an edge, and wherein the millimeter wave antenna further comprises a matching metal post disposed on the second metal plate and surrounds the edge.

8. The millimeter wave antenna of claim 1, wherein an operating frequency of the millimeter wave antenna comprises frequency bands of n257 (26.5 gigahertz (GHz) to 29.5 GHz), n258 (24.25 GHz to 27.5 GHZ), n259 (40.5 GHz to 43.5 GHZ), n260 (37 GHz to 40 GHz), and n261 (27.5 GHz to 28.35 GHz).

9. The millimeter wave antenna of claim 5, wherein the first feeder is configured to stimulate the cavity and the first slot to generate a first resonance mode, wherein the first slot is configured to stimulate the radiation patch to generate a second resonance mode and a third resonance mode, wherein resonance frequencies of the first resonance mode, the second resonance mode, and the third resonance mode are different, and wherein the parasitic metal post and the radiation patch are further configured to generate a fourth resonance mode.

10. The millimeter wave antenna of claim 9, further comprising a second feeder, wherein the second metal plate further comprises a second slot intersects with the first slot, and wherein the radiation patch further comprises:

a second patch slot; and at least four patch elements.

11. The millimeter wave antenna of claim 10, wherein the second feeder is further configured to stimulate the cavity and the second slot to generate the first resonance mode, wherein the second slot is further configured to stimulate the radiation patch to generate the second resonance mode and the third resonance mode, and wherein the parasitic metal post and the radiation patch is further configured to generate the fourth resonance mode.

12. An apparatus comprising:

a radio frequency system comprising at least one of a filter, a switch, a low noise amplifier, or a power amplifier; and an array antenna comprising:

at least one antenna element comprising:

a millimeter wave antenna comprising:

a first metal plate;

at least one via;

a second metal plate electrically coupled to the first metal plate through the at least one via and comprising a first slot;

a cavity formed by the first metal plate and the second metal plate;

a first feeder disposed in the cavity to feed the cavity;

a radiation patch comprising at least two patch elements;

a plurality of parasitic patches arranged around the radiation patch; and a first patch slot formed between the at least two patch elements, wherein the first metal plate, the second metal plate, and the radiation patch are arranged in a stack manner, wherein the first slot is configured to feed the radiation patch, and wherein the cavity is a rectangle, and wherein the first slot is disposed along a diagonal of the cavity.

13. The apparatus of claim 12, wherein the radiation patch is rectangular, circular, ring-shaped, fan-shaped, or diamond-shaped.

14. An electronic device comprising:

an antenna carrier; and a millimeter wave antenna disposed on the antenna carrier and comprising:

a first metal plate;

at least one via;

a second metal plate electrically coupled to the first metal plate through the at least one via and comprising a first slot;

a cavity formed by the first metal plate and the second metal plate;

a first feeder disposed in the cavity to feed the cavity;

a radiation patch comprising at least two patch elements;

a plurality of parasitic patches arranged around the radiation patch; and a first patch slot formed between the at least two patch elements, wherein the first metal plate, the second metal plate, and the radiation patch are arranged in a stack manner, wherein the first slot is configured to feed the radiation patch, and wherein the cavity is a rectangle, and wherein the first slot is disposed along a diagonal of the cavity.

15. The electronic device of claim 14, wherein the antenna carrier is a middle frame of the electronic device, a rear cover of the electronic device, a display of the electronic device, or a circuit board of the electronic device.

16. The electronic device of claim 14, wherein the first metal plate, the second metal plate, and the at least one via enclose the cavity.

17. The electronic device of claim 14, wherein the first slot is arrow-shaped, rectangular, H-shaped, dumbbell-shaped, or butterfly-shaped.

18. The electronic device of claim 14, wherein the radiation patch is rectangular, circular, ring-shaped, fan-shaped, or diamond-shaped.

* * * * *